(12) United States Patent
Narayanmurthy et al.

(10) Patent No.: US 11,328,512 B2
(45) Date of Patent: May 10, 2022

(54) METHOD AND SYSTEM FOR GENERATING A TEXT SUMMARY FOR A MULTIMEDIA CONTENT

(71) Applicant: Wipro Limited, Bangalore (IN)

(72) Inventors: Vinutha B Narayanmurthy, Bangalore (IN); Sibsambhu Kar, Bangalore (IN); Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 43 days.

(21) Appl. No.: 16/695,437

(22) Filed: Nov. 26, 2019

(65) Prior Publication Data
US 2021/0097294 A1    Apr. 1, 2021

(30) Foreign Application Priority Data

Sep. 30, 2019  (IN) .............................. 201941039589

(51) Int. Cl.
*G06V 20/40* (2022.01)
*G06T 7/246* (2017.01)
(Continued)

(52) U.S. Cl.
CPC .............. *G06V 20/47* (2022.01); *G06T 7/248* (2017.01); *G06V 20/52* (2022.01); *G06V 40/20* (2022.01);
(Continued)

(58) Field of Classification Search
None
See application file for complete search history.

(56) References Cited

U.S. PATENT DOCUMENTS 9,330,171 B1 *  5/2016  Shetty ................ G06K 9/00744
9,940,339 B2    4/2018  Murthy et al.
(Continued)

FOREIGN PATENT DOCUMENTS

CN        105279495 A    1/2016
KR     20020077491 A    10/2002

OTHER PUBLICATIONS

Video copy detection using spatio-temporal CNN features, by Zhou et al., IEEE Access, publication Jul. 22, 2019, pp. 100658-100665 (Year: 2019).*

(Continued)

*Primary Examiner* — Nikkram Bali
(74) *Attorney, Agent, or Firm* — Finnegan, Henderson, Farabow, Garrett & Dunner, LLP (57) ABSTRACT

The present disclosure relate to effectively determining spatial and temporal features for extracting low-level and high-level features from image frames of a multimedia content. A plurality of image frames are received from an imaging unit. Spatial filters are applied on each image frame to generate a first set of activation maps which provide spatial features in the image frames. Further, a temporal filter is applied on the plurality of image frames at a plurality of levels to generate one or more second set of activation maps corresponding to each level for determining temporal features in the image frames. Thereafter, the spatial feature from each image and temporal feature of the plurality of image frames from each level is extracted, which represent low-level and high-level spatial and temporal features.

14 Claims, 7 Drawing Sheets

(51) Int. Cl.
*G06V 20/52* (2022.01)
*G06V 40/20* (2022.01)
(52) U.S. Cl.
CPC .............. *G06T 2207/10016* (2013.01); *G06T 2207/20084* (2013.01); *G06T 2207/30196* (2013.01)

(56) References Cited

U.S. PATENT DOCUMENTS

| | | | |
|---|---|---|---|
| 10,455,297 B1* | 10/2019 | Mahyar | G10L 15/1815 |
| 2020/0057965 A1* | 2/2020 | Howard | G06N 20/10 |
| 2020/0110928 A1* | 4/2020 | Al Jazaery | G06K 9/4652 |

OTHER PUBLICATIONS

Translating videos to natural language using deep recurrent neural networks, by Venugopalan et al., arXiv:1412.4729v3; Apr. 30, 2015 (Year: 2015).*

Temporal spatial mapping for action recognition, by Song et al., arXiv:1809.03669v1; Sep. 11, 2018 (Year: 2018).*

Human action recognition using factorized spatio-temporal convolution networks, by Sun et al., 2015 IEEE International conference on computer vission, pp. 4597-4605 (Year: 2015).*

Sah, S., et al., "Semantic Text Summarization of Long Videos", 2017 IEEE Winter Conference on Applications of Computer Vision, pp. 989-997.

* cited by examiner

METHOD AND SYSTEM FOR GENERATING A TEXT SUMMARY FOR A MULTIMEDIA CONTENT

TECHNICAL FIELD

The present disclosure relates to video analytics. More particularly, the present disclosure relates to a method and system for generating a text summary for a multimedia content.

BACKGROUND

Video surveillance is quite common and is used in numerous fields including but not limited to retail shops for targeted advertisements, airports and railways for detecting potential risks, education institutes to capture student interests. Conventionally, video surveillance was monitored manually and decisions were based on human interpretation of video feeds. Gradually, with the advancements in computer vision technology, computing systems are able to monitor the video feeds and analyse the video feeds. Video surveillance analytics include determining spatial and temporal features in video frames.

The conventional techniques of video analysis include determining objects in a video, detect movement of subjects, classify different objects and the like. Advance video analytics techniques use Artificial Intelligence (AI) techniques to perform the above tasks. Applications such as retail shops and airports require high precision of video analysis. However, existing systems fail to capture low-level features in image frames due to which many details in the image frames are not analysed. Such deficiency in analytics especially in applications involving potential risks, may prove to be costly. Also, applications requiring fine details from image frames for business development, cannot rely on existing systems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for generating a text summary of a multimedia content. The method comprises receiving, by a computing unit, a plurality of image frames of the multimedia content. Further, the method comprises generating a first set of activation maps by applying a spatial filter on each image frame from the plurality of image frames for determining one or more spatial features in each image frame from the plurality of image frames. Furthermore, the method comprises generating one or more second set of activation maps corresponding to applying a temporal filter on the first set of activation maps at plurality of levels, for determining one or more temporal features in the plurality of image frames using each activation map from the one or more second set of activation maps. Thereafter, the method comprises extracting the determined one or more spatial features in each image frame from the plurality of image frames and the determined one or more temporal features in the plurality of image frames, for generating a text summary for the multimedia content.

In an embodiment, the present disclosure discloses a computing unit for generating a text summary for a multimedia content. The computing unit comprising a processor and a memory. The processor is configured to receive a plurality of image frames of the multimedia content. Further, the processor is configured to generate a first set of activation maps by applying a spatial filter on each image frame from the plurality of image frames for determining one or more spatial features in each image frame from the plurality of image frames. Furthermore, the processor is configured to generate one or more second set of activation maps corresponding to applying a temporal filter on the first set of activation maps at plurality of levels, for determining one or more temporal features in the plurality of image frames using each activation map from the one or more second set of activation maps. Thereafter, the processor is configured to extract the determined one or more spatial features in each image frame from the plurality of image frames and the determined one or more temporal features in the plurality of image frames, for generating a text summary for the multimedia content.

In an embodiment, the present disclosure discloses a non-transitory computer readable medium including instructions stored thereon that when processed by at least one processor cause a device to perform operations comprising receiving a plurality of image frames of the multimedia content, generating a first set of activation maps by applying a spatial filter on each image frame from the plurality of image frames for determining one or more spatial features in each image frame from the plurality of image frames, generating one or more second set of activation maps corresponding to applying a temporal filter on the first set of activation maps at plurality of levels, for determining one or more temporal features in the plurality of image frames using each activation map from the one or more second set of activation maps, extracting the determined one or more spatial features in each image frame from the plurality of image frames and the determined one or more temporal features in the plurality of image frames, for generating a text summary for the multimedia content The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Existing video analytics systems use Convolution Neural Network (CNN) based techniques to extract spatial and temporal features from image frames. However, the existing CNN techniques reduces dimension of the image frames limiting the capability of video analytics system to capture low-level features (e.g., finger movements, neck movements and the like). Such low-level features may provide valuable information to determine behaviour of subjects. The behaviour of subjects may be used to determine subject likes and dislikes by applications in retail domain. Further, such behaviour may be used to detect potential risks, for example, in airport.

Embodiments of the present disclosure relate to effectively determining spatial and temporal features for extracting low-level and high-level features from image frames of a multimedia content. A plurality of image frames are received from an imaging unit. Spatial filters are applied on each image frame to generate a first set of activation maps. The first set of activation maps provide spatial features in the image frames. Further, a temporal filter is applied on the plurality of image frames at a plurality of levels to generate one or more second set of activation maps corresponding to each level. The one or more second set of activation maps provide temporal features in the image frames. Thereafter, the spatial feature from each image and temporal feature of the plurality of image frames from each level is extracted. The extracted features represent low-level and high-level spatial and temporal features. The low-level and high-level features are sued to determine a behaviour of a subject in the image frame and generate a text summary for the multimedia content based on the behaviour of the subject, spatial and temporal features in the image frames.

Figure 1:
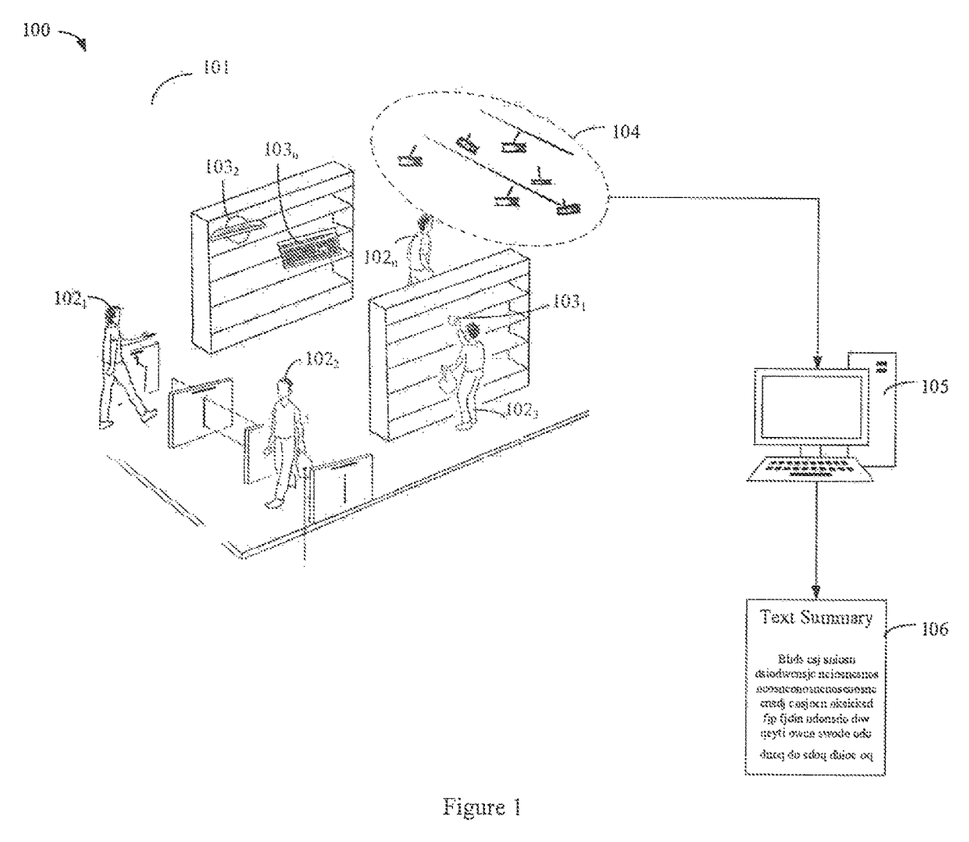
FIG. 1 shows an exemplary environment illustrating generation of a text summary for a multimedia content, in accordance with some embodiments of the present disclosure.

FIG. 1 shows an environment (100) for generating a text summary of a multimedia content. As shown the environment (100) comprises a premise (101) under video surveillance, one or more subjects ($102_1$, $102_2$, . . . , $102_n$). The premise (101) may comprise a one or more objects ($103_1$, $103_2$, . . . , $103_n$). The premise (101) may be monitored by one or more imaging devices (104). For example, the premise (101) may be a retail shop and the one more subjects ($102_1$, $102_2$, . . . , $102_n$) may be customers purchasing the one or more objects ($103_1$, $103_2$, . . . , $103_n$). The one or more imaging device (104) may capture a plurality of images and video (also referred as multimedia content) of the one or more subjects ($102_1$, $102_2$, . . . , $102_n$) and the one or more objects ($103_1$, $103_2$, . . . , $103_n$). In another example, the premise (101) may be an airport and the one or more subjects ($102_1$, $102_2$, . . . , $102_n$) may be passengers and the one or more objects ($103_1$, $103_2$, . . . , $103_n$) may be the objects carried by the passengers. The environment further comprises a computing unit (106). In an embodiment, the computing unit (105) may be located within the premise (105) or may be located remote to the premise (105). In an embodiment, when the computing unit (105) is located within the premise (101), the one or more imaging unit (104) may provide the multimedia content to the computing unit (105) via a local network (not shown) such as a Local Area Network (LAN) or via short range wireless technologies like Bluetooth, Wireless Fidelity (Wi-Fi) or any other 802.11 based technology. In an embodiment, when the computing unit (105) is located remote to the premise (101), the multimedia content may be provided via long distance communication techniques such as the Internet. The computing unit (105) may be a personal computer, a laptop, a mobile, a tablet, or any other computing device.

In an embodiment, the computing unit (105) may process the multimedia content to generate a text summary (106) of one or more events occurring in the multimedia content. The text summary (106) may be a text document. In an embodiment, the text summary (106) may describe the one or more events occurring in the multimedia content. In a further embodiment, the generated text summary (106) may be displayed on a display unit (not shown). Thus, a person viewing the text summary (106) may clearly identify intricate details in the multimedia content.

Figure 2:
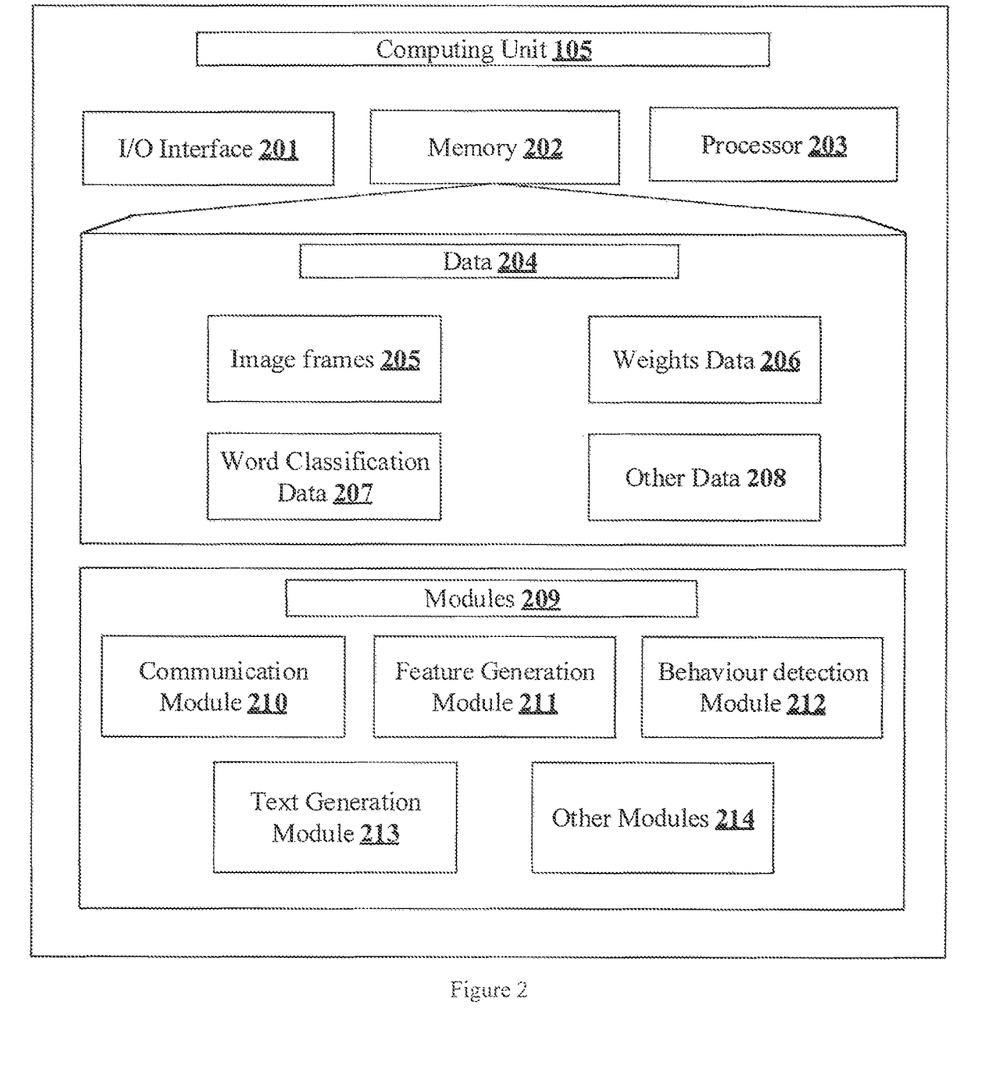
FIG. 2 shows an internal architecture of a computing unit for generating a text summary for a multimedia content, in accordance with some embodiments of the present disclosure.

FIG. 2 illustrates internal architecture of the computing unit (105) in accordance with some embodiments of the present disclosure. The computing unit (105) may include at least one Central Processing Unit ("CPU" or "processor") (203) and a memory (202) storing instructions executable by the at least one processor (203). The processor (203) may comprise at least one data processor for executing program components for executing user or system-generated requests. The memory (202) is communicatively coupled to the processor (203). The computing unit (105) further comprises an Input/Output (I/O) interface (201). The I/O interface (201) is coupled with the processor (203) through which an input signal or/and an output signal is communicated.

In an embodiment, data (204) may be stored within the memory (202). The data (204) may include, for example, image frames (205), weights data (206), word classification data (207), and other data (208).

In an embodiment, the image frames (205) are also referred as plurality of image frames (205). The plurality of image frames (205) may be generated at predefined time intervals. For example, for every 0.2 s, 5 frames may be generated. In an embodiment, the one or more imaging unit (104) may capable of capturing the plurality of image frames (205) at high frame rate. The plurality of frames (205) may be raw images or may be pre-processed and may be suitable for being processed by the computing unit (105).

In an embodiment, the weights data (206) may indicate weight associated with one or more Artificial Intelligence (AI) techniques. In an embodiment the one or more AI techniques may be used to process the plurality of image frames (205). In an embodiment, the weight data (206) may be used by a Recurrent Neural Network (RNN) for determining a behaviour of one or more subjects ($102_1$, $102_2$ . . . $102_n$). Further, the weight data (206) may also be used by the RNN for generating a text summary of the one or more events occurring in the plurality of image frames (205).

In an embodiment, the word classification data (207) may comprise a mapping of behaviour to words. For example, a person standing may be associated with the word "stand".

In an embodiment, the other data (208) may include behaviour classifications, highlight words. Behaviour classifications may include different type of behaviour of the one or more subjects ($102_1$, $102_2$ . . . $102_n$). The highlight words may indicate specific behaviours of the one or more subjects ($102_1$, $102_2$ . . . $102_n$) that are unique or different for the premise (101). For example, in an airport, the highlight words like "gun", "explosive" may be used to detect potential threats. In a retail shop, highlight words like "staring for too long" may indicate that a customer is interested in a product.

In one implementation, the modules (209) may include, for example, a communication module 210, a feature generation module (211), a behaviour detection module (212), a text generation module (213) and other modules (214). It will be appreciated that such aforementioned modules (209) may be represented as a single module or a combination of different modules.

In an embodiment, the communication module (210) may receive the plurality of image frames (205) from the one or more imaging unit (104). The communication module (210) may receive the plurality of image frames (205) over a wired network or a wireless network.

In an embodiment, the feature generation module (211) may be configured to determine one or more spatial features and one or more temporal features in the plurality of image frames (205). In an embodiment, the feature generation module (211) may use Convolution Neural Network (CNN) techniques for determining the one or more spatial features and one or more temporal features in the plurality of image frames (205). In an embodiment, the feature generation module (211) may generate one or more feature vectors which provide information about the one or more spatial and temporal features.

In an embodiment, the behaviour detection module (212) may be configured to detect a behaviour of a subject (e.g., $102_1$). The behaviour detection module (212) may use the one or more feature vectors generated by the feature generation module (211) to determine the behaviour of the subject ($102_1$). In some embodiment, the behaviour detection module (212) may use RNN techniques to determine the behaviour of the subject ($102_1$). In some embodiment, the behaviour detection module (212) may use other AI techniques like Bayes classifiers, Markov models, dynamic Bayesian networks. The behaviour detection module (212) may output a behaviour vector indicting the behaviour of the subject ($102_1$).

In an embodiment, the text generation module (213) may generate a text of one or more events occurring in the plurality of image frames (205) using the behaviour vector from the behaviour detection module (212) and the feature vector from the feature generation module (211). In some embodiment, the text generation module may use RNN techniques to generate the text. Further, the text generation module (213) may generate a summary for the generated text.

In an embodiment, the other modules (214) may include a display unit, an alarm unit, an analysis unit and the like. The display unit may display the generated text summary. The alarm unit may generate an alarm when restricted words are identified in the text summary. The analysis module may perform analysis on the generated text summary. For example, the analysis may be used to determine interest of a subject ($102_1$) in a retail shop.

Figure 3:
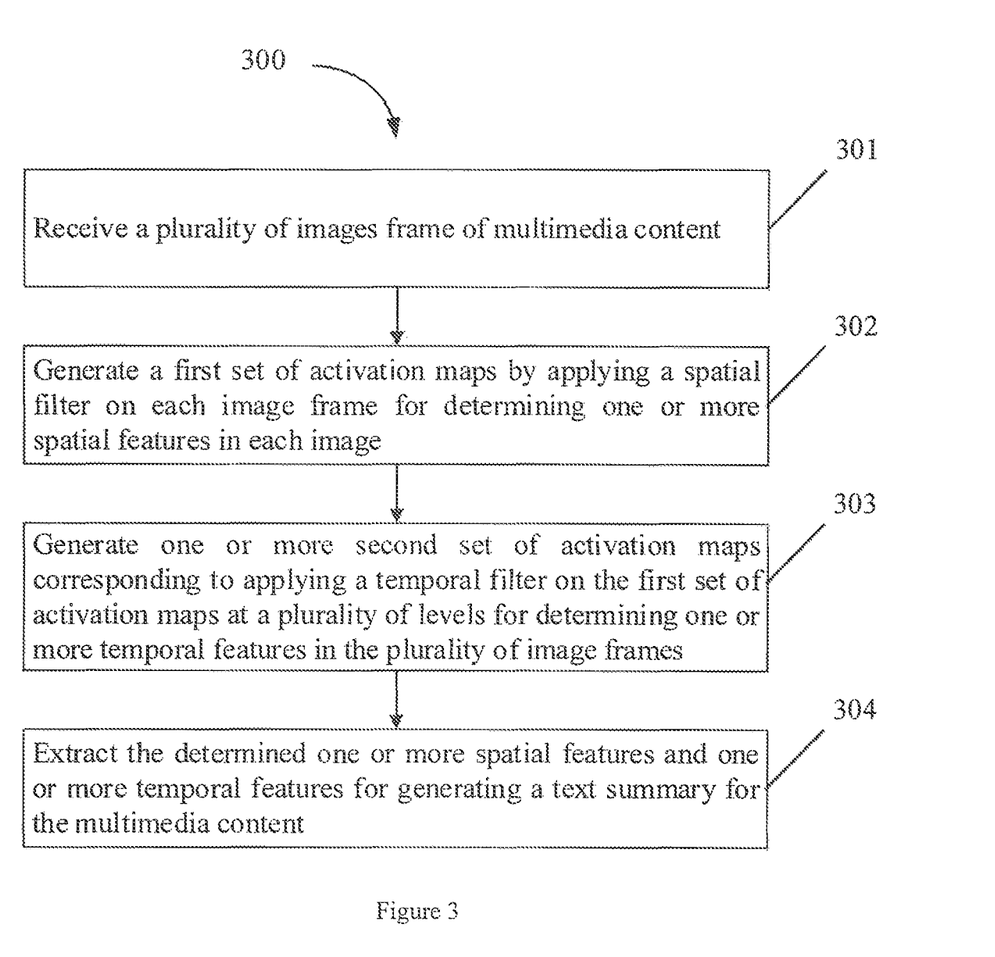
FIG. 3 shows an exemplary flow chart illustrating method steps for generating a text summary for a multimedia content, in accordance with some embodiments of the present disclosure.

FIG. 3 shows a flow chart illustrating a method for generating a text summary for a multimedia content, in accordance with some embodiments of the present disclosure. As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step (301), the communication module (210) may receive the plurality of image frames (205). In an embodiment, for a live multimedia content, the plurality of image frames (205) may be received from the one or more imaging unit (104) as and when the plurality of image frames (205) are recorded. In an embodiment, the plurality of image frames (205) may be retrieved from a database (not shown). The database may store a plurality of multimedia content. In an embodiment, the plurality of image frames (205) may be raw data or pre-processed data. Pre-processing may include but not limited to sharpening the plurality of image frames (205), reducing noise in the plurality of image frames (205), adjusting contrast, brightness, hue parameters of the plurality of image frames (205). The communication module (210) may be capable of receiving the plurality of image frames (205) at a high rate. For example, when the one or more imaging unit (104) captures the plurality of image frames (205) at a defined frame rate, the communication module (210) must be capable of receiving the plurality of image frames (205) at the predefined frame rate.

Figure 4:
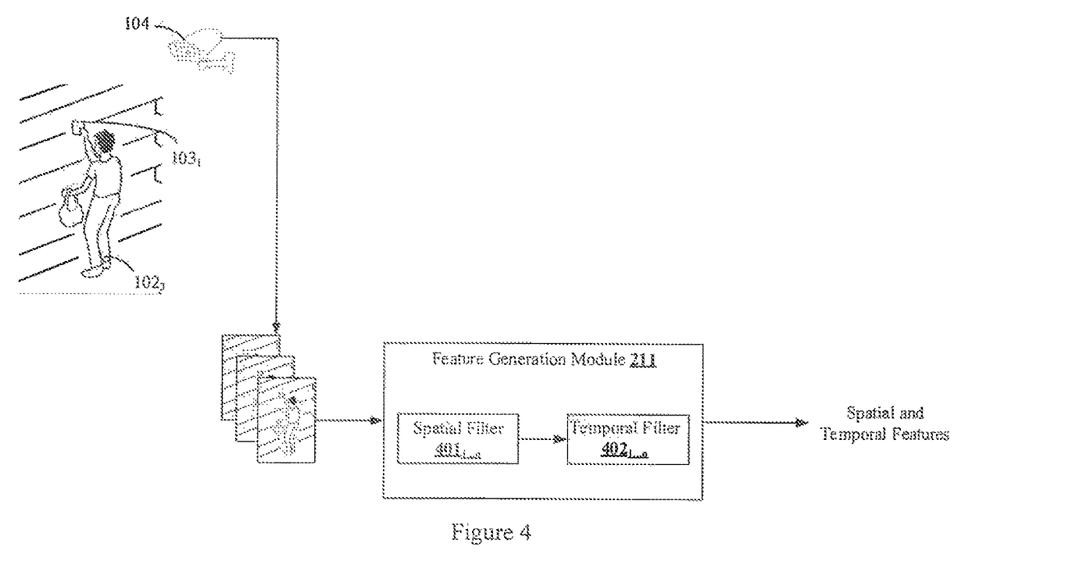
FIG. 4 shows an exemplary block diagram illustrating generation of spatial and temporal features using image frames, in accordance with some embodiments of the present disclosure.

At step (302), the feature generation module (211) may generate a first set of activation maps by applying a spatial filter on each image frame from the plurality of image frames (205) for determining one or more spatial features in each image frame. Reference is now made to FIG. 4 where a broad illustration of generating the one or more spatial features and the one or more temporal features is shown. An imaging unit (104) may capture an event where a customer ($102_3$) is picking up a product ($103_1$) in a retail shop. The imaging unit (104) may provide the plurality of image frames (205) to the computing unit (105). The feature generation unit (211) of the computing unit (105) may obtain the plurality of image frames (205). The feature generation module (211) may comprise one or more spatial filters ($401_{1...n}$) and one or more temporal filters ($402_{1...n}$). The feature generation module (211) may apply the one or more spatial filters ($401_{1...n}$) on each image frame from the plurality of image frames (205). The one or more spatial filters ($401_{1...n}$) may be one or more convolution kernels. In an embodiment, the plurality of image frames (205) may be represented as an image matrix comprising a plurality of elements. Each element of the matrix represents a pixel value. A convolution kernel is a matrix comprising elements that have to be convoluted with the image matrix/image matrices. The convolution is performed to represent the features of the plurality of image frames (205). In an embodiment, the CNN follows an encoder-decoder framework, where the plurality of image frames (205) are represented in a latent space (reduced dimension). The reduced dimension of the plurality of image frames (205) reduces amount of processing required. The convolution kernel may be of any predefined size and stride. The output of each convolution filter is called as an activation map. The output of the one or more spatial filters ($401_{1...n}$) together is defined as a first set of activation maps. In an embodiment, the first set of activation maps is used to determine the one or more spatial features in respective image frames. In an embodiment, the one or more spatial features comprises at least one of, an edge of an object in an image frame from the plurality of image frames, a color of an object in the image frame, a saturation of the image frame, coordinates of the image frame, intensity of the image frame, and a resolution of the image frame. Considering the plurality of image frames (205) as provided in FIG. 4, the one or more spatial features may include, the object ($103_1$), and the subject ($102_3$).

In an embodiment, a dilated convolution technique may be used to increase receptive field. For example, a dilated convolution kernel of size 2×2 may provide similar receptive filed as a normal convolution kernel of 3×3. In a dilated convolution kernel, zeroes are padded based on a dilation factor. The dilated convolution may reduce number of hidden layers in the CNN.

At step (303), the feature generation module (211) generates one or more second set of activation maps corresponding to applying a temporal filter on the first set of activation maps at a plurality of levels for determining one or more temporal features in the plurality of image frames. The feature generation module (211) applies the one or more temporal filters ($402_{1...n}$) on the first set of activation maps. In an embodiment, a first temporal filter (e.g., $401_1$) may be applied on the first set of activation maps at a first level. Further, a second temporal filter (e.g., $401_2$) may be applied on the output of the first temporal filter ($401_1$) at a second level. Each level of application of the temporal filter reduces the dimension of the activation map from previous level. In an embodiment, the one or more temporal filters ($402_{1...n}$) implement temporal convolution. In an embodiment, the one or more temporal features include at least a motion of one or more objects in the plurality of image frames (205).

In an embodiment, the one or more spatial features and the one or more temporal features are input to a Fully Connected (FC) layer. The FC layer may generate the feature vector indicative of a representative vector indicating the one or more spatial features and the one or more temporal features.

At step (304), the feature generation module (211) extracts the one or more spatial features from each image frame of the plurality of image frames (205) and the one or more temporal features from each level among the plurality of levels. Due to reduction in spatial dimension of activation maps in each level, the temporal features cannot be detected easily. Hence, the feature generation module (211) extracts the one or more temporal features from each level. Therefore, high-level temporal features as well as low-level temporal features are extracted. As a result, micro movements as well as macro movements are detected.

Figure 5:
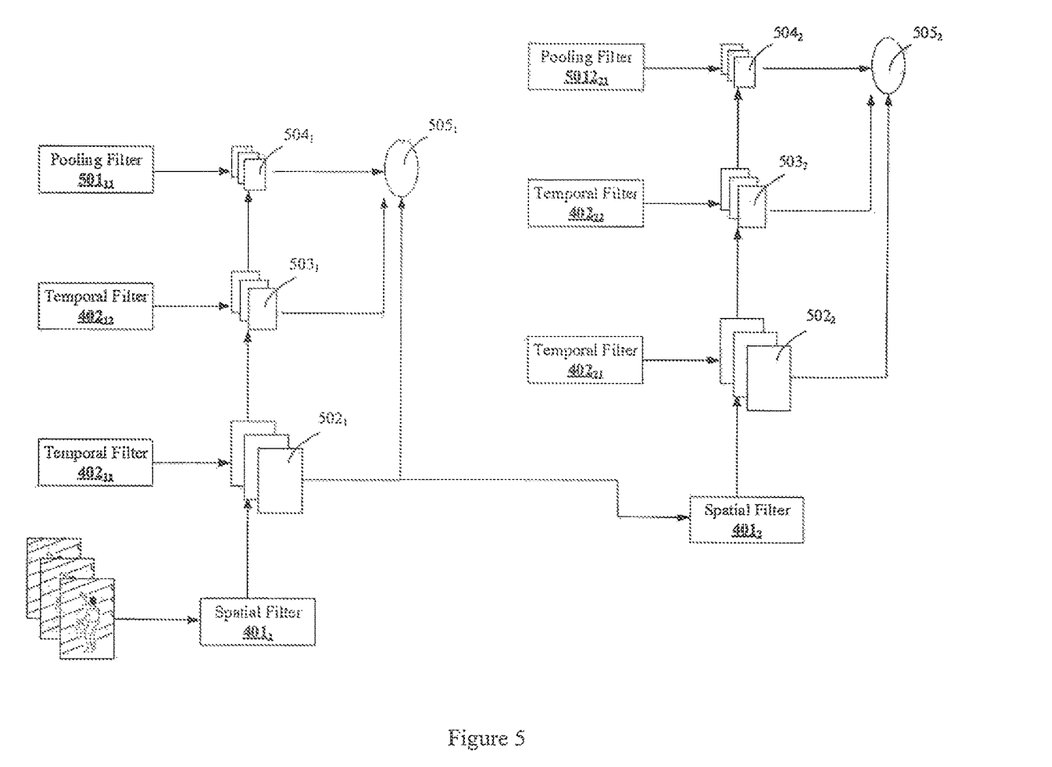
FIG. 5 shows an exemplary block diagram of a Convolution Neural Network (CNN) for determining spatial and temporal features, in accordance with embodiments of the present disclosure.

A detailed approach of applying the one or more spatial filters ($401_{1...n}$) and the one or more temporal filters ($401_{1...n}$) is shown in FIG. 5. As shown, the first spatial filter ($401_1$) is applied on each image frame of the plurality of image frames (205). The output of the first spatial filter ($401_1$) is a first set of activation maps ($502_1$). The first set of activation maps ($502_1$) has reduced dimensions than the plurality of image frames (205). The one or more spatial features are extracted from the first set of activation maps. The extracted one or more spatial features may be used to determine low-level spatial features. Further, a first level temporal filter ($402_{11}$) is applied on the first set of activation maps ($502_1$). An output of the first level temporal filter ($402_{11}$) is a first level second set of activation maps which provides low-level temporal features. A second level temporal filer ($402_{12}$) is applied on the output of the first level temporal filter ($402_{11}$), resulting in a second level second set of activation maps which is used to determine high-level temporal features. Thereafter, a pooling filter ($501_{11}$) may be used to reduce the size of the second set of activation maps. For example, a max-pool filter or an average pool filter may be used The max-pool filter may extract a maximum value when a pooling filter is slide over an image matrix. Likewise, an average pool filter extracts an average of values when a pooling filter is slide over an image matrix.

In an embodiment, a second level of spatial filter ($401_2$) may be applied on the first set of activation maps ($502_1$). Further, the temporal filters ($402_{1...n}$) may be applied on an output of the second level of spatial filter ($401_2$), as explained above, and one or more spatial and temporal features are extracted as explained above. The extracted one or more spatial and temporal features ($505_1$ and $505_2$) may be used to generate the feature vector.

Figure 6:
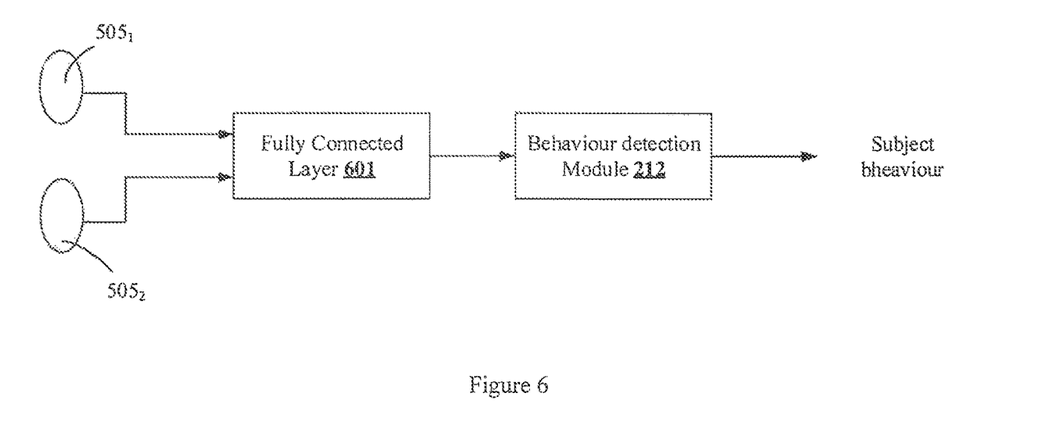
FIG. 6 shows a block diagram for determining behaviour of a subject, in accordance with embodiments of the present disclosure.

Reference is now made to FIG. 6 illustrating generation of behaviour of the subject ($102_3$). As shown, the extracted one or more spatial and temporal features ($505_1$ and $505_2$) are provided to the FC layer which generates the feature vector. The feature vector is then provided to the behaviour detection module (212) for determining a behaviour of the subject ($102_3$). The behaviour detection module (212) may implement RNN using techniques like Long-Short Term Memory (LSTM) to detect the behaviour (behaviour vector). In an embodiment, the LST technique uses previous outputs and weights to predict the behaviour of the subject ($102_3$). In an embodiment, the behaviour detection may include actions and activities. In a further embodiment, the behaviour detection may include interaction. The action and activities may include a state of the subject ($102_3$) (such as standing, walking, sitting, etc.) or an event performed by the subject ($102_3$) (such as starting, talking, writing, etc.), or a combination of both action and activities. The interaction may include a task performed by the subject ($102_3$) with the one or more object ($103_1$, $103_2$, ... $103_n$) (such as looking at the object, lifting the object, making the payment, answering the question, etc.). In an embodiment, the LSTM technique may classify the detected behaviours into predefined classes. Hence, a classifier may be sued to label the detected behaviours.

Figure 7:
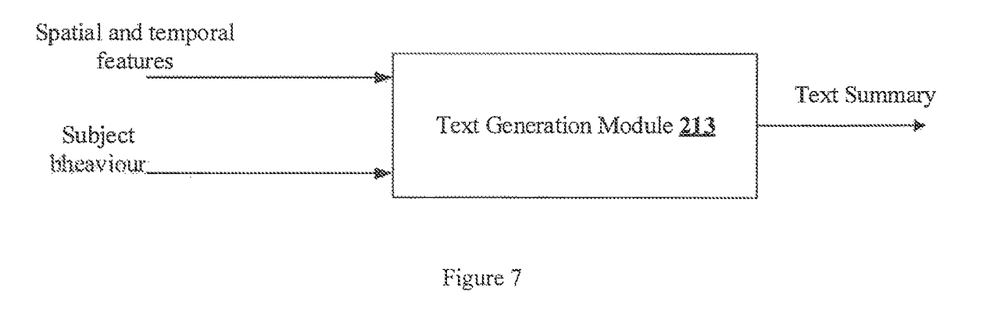
FIG. 7 shows a block diagram for determining a text summary of a multimedia content, in accordance with embodiments of the present disclosure.

Referring to FIG. 7, a block diagram for generating a text summary for the multimedia content is disclosed. The text generation module (213) receives the behaviour of the subject ($102_3$) from the behaviour detection module (212) and the feature vector from the feature generation module (211). The text generation module (213) may use LSTM or Gated Recurrent Units (GRU)-LSTM for generating a text from input vectors. The LSTM based techniques may be trained to predict words based on the behaviour vector and the feature vector. Further, text summarization techniques may be used to summarize the text. For example, sentiments in the text may be analyzed to understand the intent of the text. Based on the sentiments, a text summary may be generated. In an embodiment, a Bi-LSTM technique may be used to predict words more effectively. The Bi-LSTM technique samples the input from opposite directions to accurately predict the words.

In an embodiment, as the text generated is based on the low-level spatial and temporal features as well as high-level spatial and temporal features, the text may comprises intricate details. For example, a passenger carrying a weapon in an airport may not be visible when viewed on a surveillance monitor. Also, when the weapon is small, the existing techniques may not be able to detect a threat due to reduction in spatial and temporal resolution. In an embodiment, a report may be generated and certain words may be highlighted. For example, words like "weapon" or "staring for long moment" may be highlighted. Therefore, appropriate and timely actions may be taken.

Computer System

Figure 8:
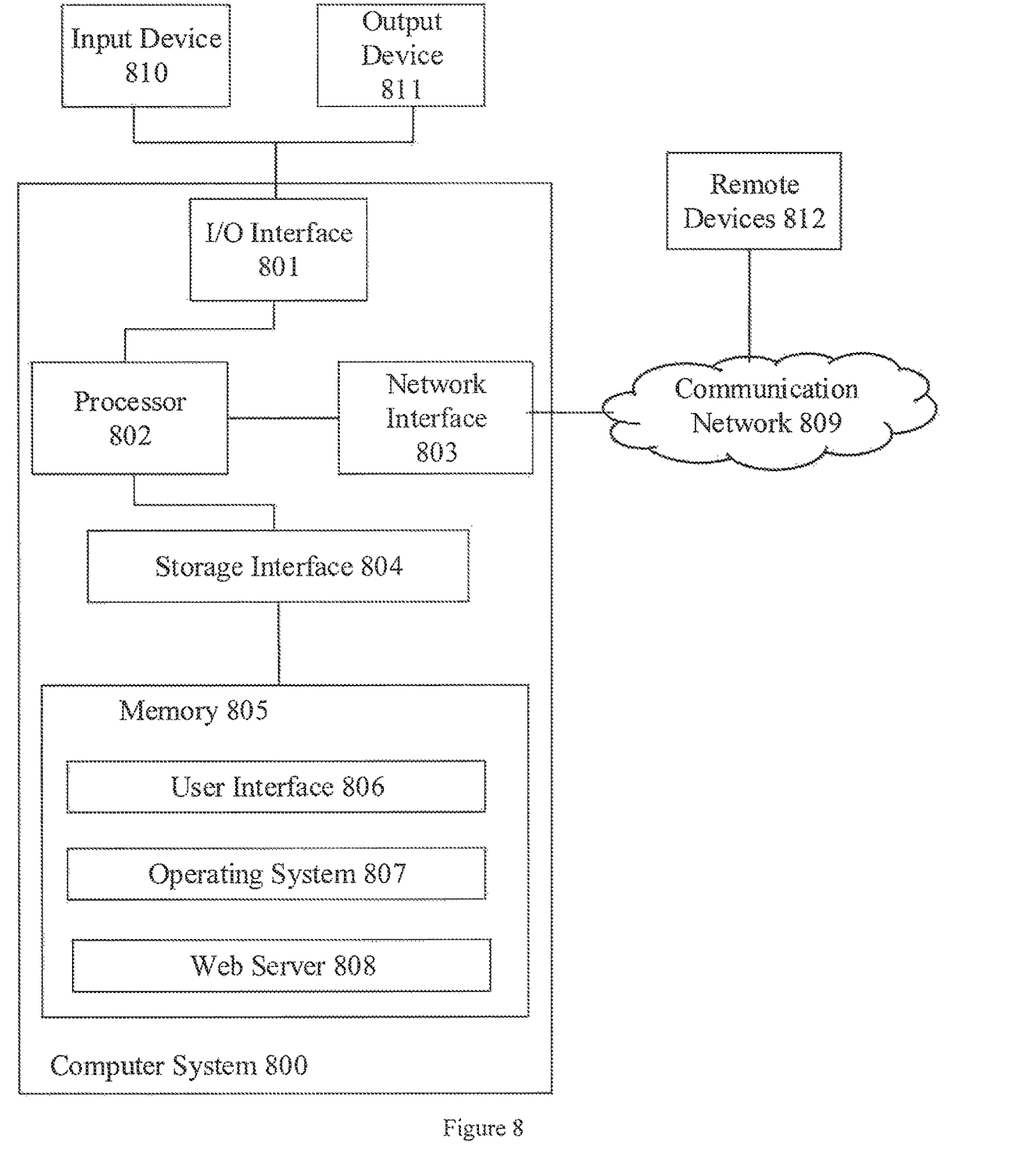
FIG. 8 shows a block diagram of a general-purpose computing system for generating a text summary for a multimedia content, in accordance with embodiments of the present disclosure.

FIG. 8 illustrates a block diagram of an exemplary computer system (800) for implementing embodiments consistent with the present disclosure. In an embodiment, the computer system (800) is used to implement generation of sentiment-based summary for user reviews. The computer system (800) may comprise a central processing unit ("CPU" or "processor") (802). The processor (802) may comprise at least one data processor. The processor (802) may include specialized processing units such as integrated system (bus) controllers, memory management control units, floating point units, graphics processing units, digital signal processing units, etc.

The processor (802) may be disposed in communication with one or more input/output (I/O) devices (not shown) via I/O interface (801). The I/O interface (801) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (801), the computer system (800) may communicate with one or more I/O devices. For example, the input device (810) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (811) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (800) is connected to the remote devices (812) through a communication network (809). The remote devices (812) may provide the user reviews to the computing network 800. The processor (802) may be disposed in communication with the communication network (809) via a network interface (803). The network interface (803) may communicate with the communication network (809). The network interface (803) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (809) may include, without limitation, a direct interconnection, local area network (LAN), wide area network (WAN), wireless network (e.g., using Wireless Application Protocol), the Internet, etc. Using the network interface (803) and the communication network (809), the computer system (800) may communicate with the scene remote devices (812). The network interface (803) may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network (809) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (802) may be disposed in communication with a memory (805)(e.g., RAM, ROM, etc. not shown in FIG. 6) via a storage interface (804). The storage interface (804) may connect to memory (805) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, RedundantArray of Independent Discs (RAID), solid-state memory devices, solid-state drives, etc.

The memory (805) may store a collection of program or database components, including, without limitation, user interface (806), an operating system (807), web server (808) etc. In some embodiments, computer system (800) may store user/application data (806), such as, the data, variables, records, etc., as described in this disclosure. Such databases may be implemented as fault-tolerant, relational, scalable, secure databases such as Oracle® or Sybase®.

The operating system (807) may facilitate resource management and operation of the computer system (800). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system (800) may implement a web browser (808) stored program component. The web browser (808) may be a hypertext viewing application, for example MICROSOFT® INTERNET EXPLORER™, GOOGLE® CHROME™ ⁰, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (808) may utilize facilities such as AJAX™, DHTML™, ADOBE® FLASH™, JAVASCRIPT™, JAVA™, Application Programming Interfaces (APIs), etc. In some embodiments, the computer system (800) may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (800) may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating a text summary for a multimedia content, comprising:

receiving, by a computing unit, a plurality of image frames of the multimedia content;

generating, by the computing unit, a first set of activation maps by applying a spatial filter on each image frame from the plurality of image frames for determining one or more spatial features in each image frame from the plurality of image frames;

generating, by the computing unit, one or more second set of activation maps corresponding to applying each temporal filter of one or more temporal filters on the first set of activation maps at each level of a plurality of levels, for determining one or more temporal features in the plurality of image frames using each activation map from the one or more second set of activation maps;

extracting, by the computing unit, one or more low-level features and one or more high level features for the one or more spatial features and the one or more temporal features, based on the one or more spatial features and the one or more temporal features;

detecting, by the computing unit, a behaviour of a subject using the one or more spatial features and the one or more temporal features, wherein the one or more low-level features and the one or more high-level features are used to determine the behavior of the subject; and extracting, by the computing unit, the determined one or more spatial features in each image frame from the plurality of image frames and the determined one or more temporal features in the plurality of image frames, for generating a text summary for the multimedia content, wherein the text summary is based on the determined behavior of the subject.

2. The method of claim 1, wherein the one or more spatial features comprise at least one of an edge of an object in an image frame from the plurality of image frames, a color of an object in the image frame, a saturation of the image frame, coordinates of the image frame, intensity of the image frame, and a resolution of the image frame.

3. The method of claim 1, wherein the one or more temporal features comprise at least a motion of an object across the plurality of image frames.

4. The method of claim 1, wherein the spatial filter and the temporal filter are implemented using Convolution Neural Network (CNN).

5. The method of claim 1, wherein the one or more temporal features are extracted using a pooling kernel comprising one of a max-pool kernel and an average kernel.

6. The method of claim 1, wherein the behaviour comprises at least one of a movement of the subject, interaction of the subject with an object, and time spent on an event by the subject.

7. The method of claim 6, wherein the behaviour of the subject is translated into the text summary.

8. The method of claim 7, wherein the behaviour of the subject is determined and the text summary is generated using Artificial Intelligence (AI) techniques.

9. A computing unit for generating a text summary for a multimedia content, comprising:
a processor; and
a memory, communicatively coupled with the processor, storing processor executable instructions, which, on execution causes the processor to:
receive a plurality of image frames of the multimedia content;
generate a first set of activation maps by applying a spatial filter on each image frame from the plurality of image frames for determining one or more spatial features in each image frame from the plurality of image frames;
generate one or more second set of activation maps corresponding to applying each temporal filter of one or more temporal filters on the first set of activation maps at each level of a plurality of levels, for determining one or more temporal features in the plurality of image frames using each activation map from the one or more second set of activation maps;

extract one or more low-level features and one or more high level features for the one or more spatial features and the one or more temporal features, based on the one or more spatial features and the one or more temporal features;

detect a behaviour of a subject using the one or more spatial features and the one or more temporal features, wherein the one or more low-level features and the one or more high-level features are used to determine the behavior of the subject; and extract the determined one or more spatial features in each image frame from the plurality of image frames and the determined one or more temporal features in the plurality of image frames, for generating a text summary for the multimedia content, wherein the text summary is based on the determined behavior of the subject.

10. The computing unit of claim 9, wherein the processor is configured to implement the spatial filter and the temporal filter using Convolution Neural Network (CNN).

11. The computing unit of claim 9, wherein the processor is configured to extract the one or more temporal features using a pooling kernel comprising one of a max-pool kernel and an average kernel.

12. The computing unit of claim 9, wherein the behaviour comprises at least one of, a movement of the subject, interaction of the subject with an object, and time spent on an event by the subject.

13. The computing unit of claim 12, wherein the processor is configured to translate the behaviour of the subject into the text summary.

14. A non-transitory computer readable medium including instructions stored thereon that when processed by at least one processor cause a device to perform operations comprising:
receiving a plurality of image frames of the multimedia content;
generating a first set of activation maps by applying a spatial filter on each image frame from the plurality of image frames for determining one or more spatial features in each image frame from the plurality of image frames;
generating one or more second set of activation maps corresponding to applying each temporal filter of one or more temporal filters on the first set of activation maps at each level of a plurality of levels, for determining one or more temporal features in the plurality of image frames using each activation map from the one or more second set of activation maps;
extracting, by the computing unit, one or more low-level features and one or more high level features for the one or more spatial features and the one or more temporal features, based on the one or more spatial features and the one or more temporal features;
detecting, by the computing unit, a behaviour of a subject using the one or more spatial features and the one or more temporal features, wherein the one or more low-level features and the one or more high-level features are sued to determine the behavior of the subject; and
extracting the determined one or more spatial features in each image frame from the plurality of image frames and the determined one or more temporal features in the plurality of image frames, for generating a text summary for the multimedia content, wherein the text summary is based on the determined behavior of the subject.

\* \* \* \* \*